United States Patent [19]

Ruckdeschel et al.

[11] 4,096,565
[45] Jun. 20, 1978

[54] INTEGRATED CIRCUIT DATA HANDLING APPARATUS FOR A DATA PROCESSING SYSTEM, HAVING A PLURALITY OF MODES OF OPERATION

[75] Inventors: Hermann Ruckdeschel, Gauting; Thomas Rambold, Munich, both of Germany

[73] Assignee: Siemens Aktiengesellschaft, Munich, Germany

[21] Appl. No.: 678,622

[22] Filed: Apr. 20, 1976

[30] Foreign Application Priority Data

Apr. 21, 1975  Germany .......................... 2517565

[51] Int. Cl.² .......................... G06F 3/04; G06F 13/00
[52] U.S. Cl. ................................................. 364/200
[58] Field of Search ................ 340/172.5, 173 R; 445/1; 235/156; 364/200 MS File, 900 MS File

[56] References Cited

U.S. PATENT DOCUMENTS

| | | | |
|---|---|---|---|
| 3,601,809 | 8/1971 | Gray et al. ........................ | 340/172.5 |
| 3,614,751 | 10/1971 | Narisawa ........................... | 340/173 R |
| 3,638,204 | 1/1972 | Kolankowsky ................. | 340/173 R X |
| 3,665,426 | 5/1972 | Gross et al. ..................... | 340/172.5 X |
| 3,689,897 | 9/1972 | Sciuchetti ....................... | 340/172.5 |
| 3,691,531 | 9/1972 | Saltini et al. .................... | 340/172.5 |
| 3,739,345 | 6/1973 | Janssens et al. ................ | 340/172.5 |
| 3,748,652 | 7/1973 | Ward et al. ..................... | 340/173 R |
| 3,787,817 | 1/1974 | Goldberg ........................ | 364/200 |

OTHER PUBLICATIONS

R. A. Skov et al., "Buffer System" in *IBM Technical Disclosure Bulletin*, vol. 2, No. 5, Feb. 1960, pp. 86–89.

*Primary Examiner*—Melvin B. Chapnick
*Attorney, Agent, or Firm*—Schuyler, Birch, Swindler, McKie & Beckett

[57] ABSTRACT

A data handling apparatus of solid state construction for a data processing system. The apparatus has a storage and input/output gates for peripheral units. The storage includes input and output counters for generating storage addresses which, respectively, determine a location for useful data to be temporarily stored while in transit and a location to which such data is to be emitted. The counting modes can be switched to accomodate connecting two or more units of the data processing system. A comparator is connected to the counter outputs and produces therefrom an indication of the state of occupation of the various storage locations.

4 Claims, 2 Drawing Figures

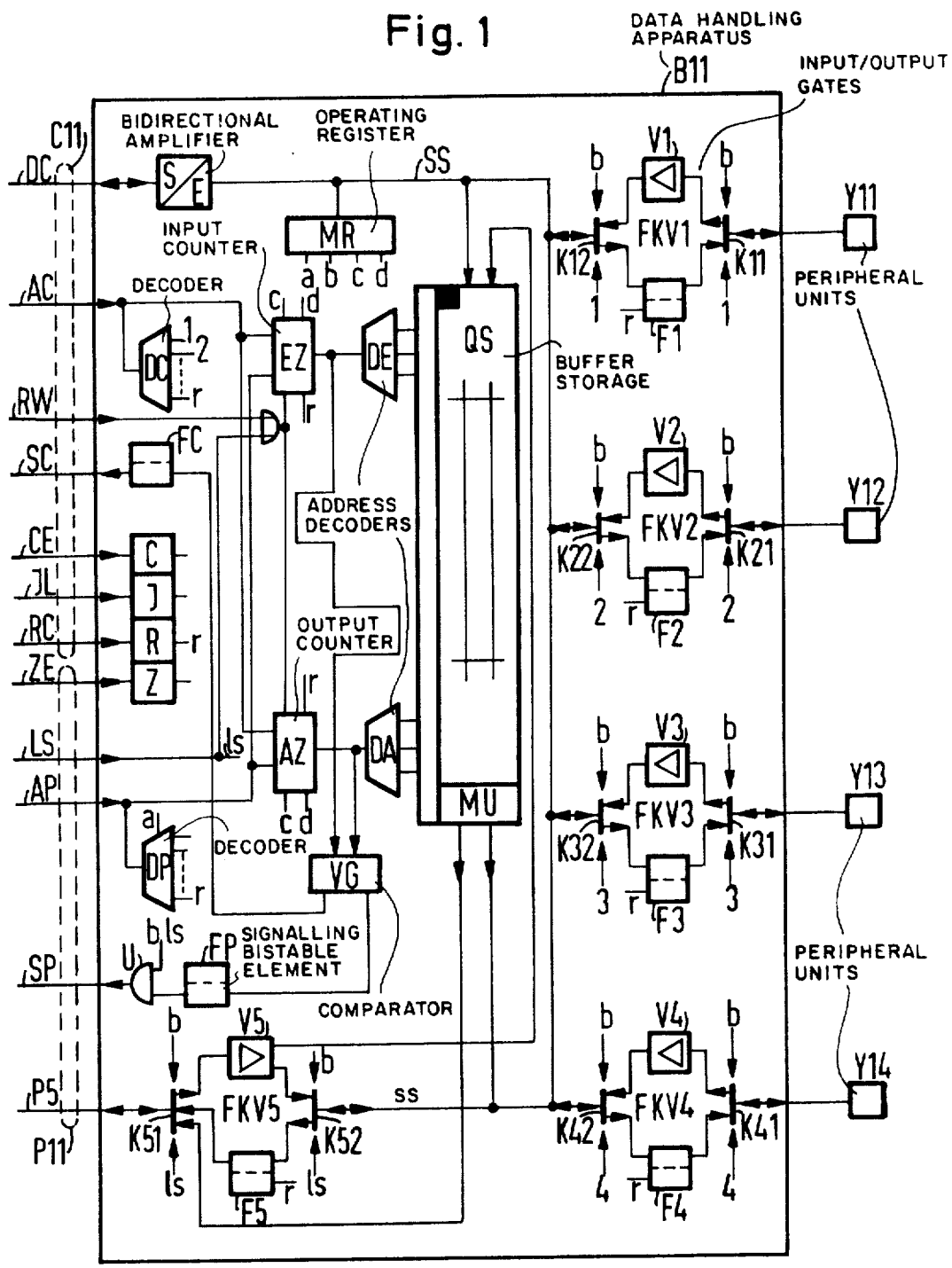

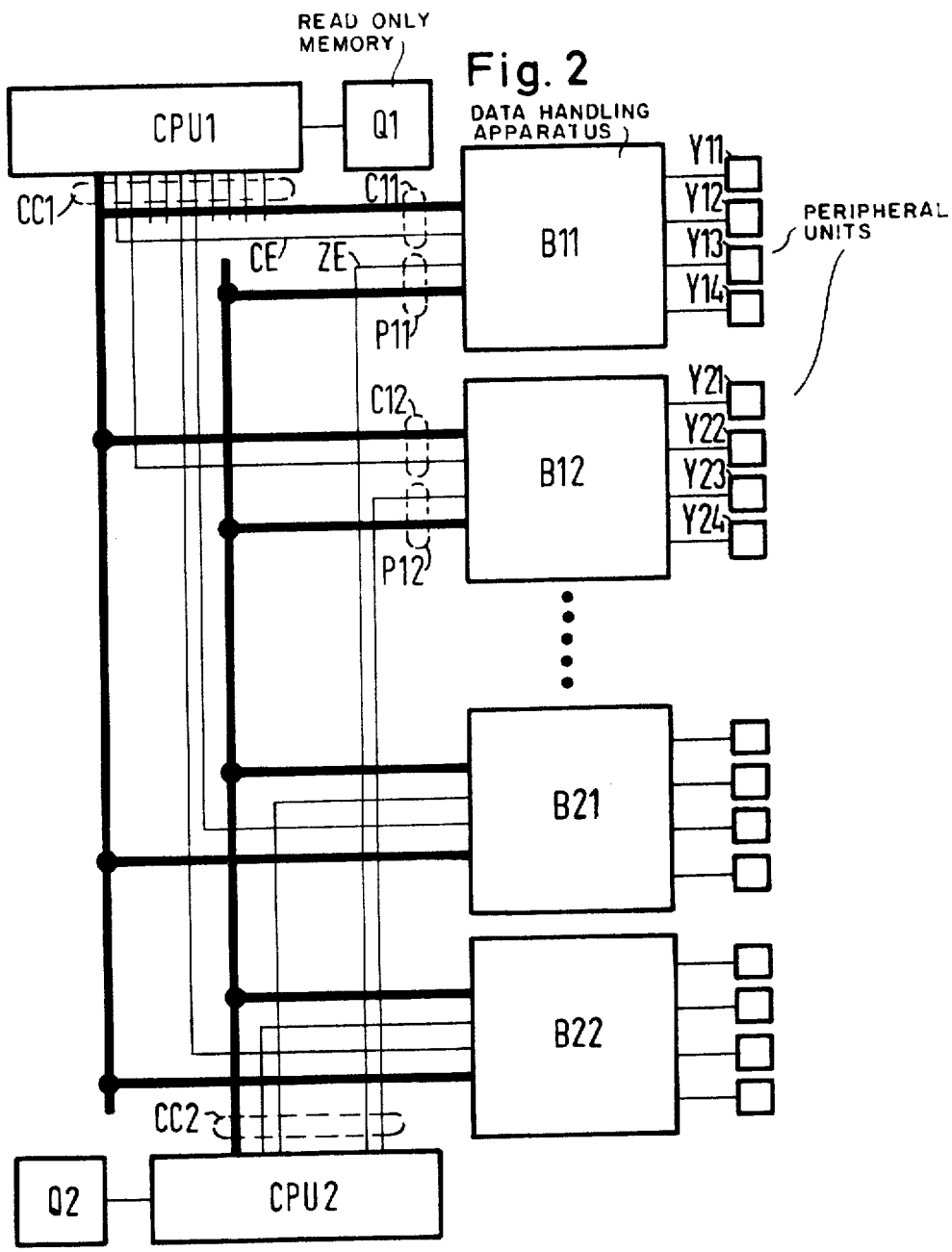

INTEGRATED CIRCUIT DATA HANDLING APPARATUS FOR A DATA PROCESSING SYSTEM, HAVING A PLURALITY OF MODES OF OPERATION

CROSS REFERENCE TO RELATED APPLICATION

Application Ser. No. 678,621, filed Apr. 20, 1976, and assigned to the same assignee as the present application, discloses a similar data handling apparatus to that of the present application. In that case, however, there is claimed an overall system divided into various subsystems which can be interconnected by way of the input-/output gates of the associated data handling apparatus.

BACKGROUND OF THE INVENTION

This invention relates to a data handling apparatus of solid state design, which forms part of a data processing system and which comprises a storage and input/output gates for peripheral units.

It is a known practice to employ data handling apparatus of solid state design with one storage and input-/output gates for peripheral units as modules of data processing units (cf. Elektronik 1974, pp. 379-395, particularly page 381 and pp. 393-394). Comparable modules having, for example, four input/output gates and associated devices for the evaluation of addresses for these gates are commercially available (cf. Rockwell International Corporation MOS/LSI Parallel Processing System, Rev. May 1973, pp. 2-13 to 2-17 and Data Sheet Parallel Processing System (PPS-4), Rev. 1, June 1974, pp. 2-1 and 8-1 to 8-3). However, a storage is lacking in such a module. Furthermore, a central basic unit is already known for a data processing system having a data storage in addition to input and output gate circuits (cf. West German published application No. 2 136 210). Moreover, the arithmetic unit is also included in this central basic unit. This might be due to the fact that this module is not of solid state design.

It is, therefore, an object of this invention to provide an appropriately designed data handling apparatus of integrated solid state construction having a storage in addition to input/output gates.

SUMMARY OF THE INVENTION

The foregoing and other objects are achieved in a data handling apparatus which is characterized in that the storage employed as a buffer storage and comprising two or more storage locations is provided in the data handling apparatus with an input and an output counter. Each counter serves as an address generator for addresses of storage locations. The input counter determines the storage location which, where appropriate, accepts momentarily the useful data, i.e., data to be processed, to be transferred between portions of the data processing system, and the output counter determines the storage location to which the useful data are emitted.

The counters, in order to change their counting mode, may be switched over such that during the interconnection of two units either only useful data for a storage location are accepted or emitted, or a block of useful data requiring two or more storage locations is accepted or emitted. A comparator is connected to the counter outputs for comparing the counter adjustments and indicating as comparison result, the busy/idle condition of the storage locations of the buffer storage.

It is known in the art to store data momentarily in storages equipped with address generators (cf. West German unexamined application Nos. 2 362 245, 2 002 369), but in the prior art devices the storages are not associated with integrated data handling apparatus having additional component assemblies.

In view of the fact that in this invention storage and input/output gates are in the same data handling apparatus, these input/output gates may at the same time be utilized for interconnection with other modules and for insertion of the buffer storage in the data path so established. Because of its buffering capability, the buffer storage can compensate different operating speeds for data input and output in these different modules. The buffer storage may, where appropriate, also be employed as a data storage for a permanently allocated control unit of the data system. Hence, the data handling apparatus constructed in accordance with the teachings of this invention can conveniently be used in different modes of operation.

For the foregoing purpose it is convenient to provide the input/output gates of an associated data handling with an output bistable element and an input amplifier, and these are connected to electronic couplers that can be governed by control data so as to define the input or output function. Thus, the function of the input/output gates is not defined by the circuit design, but it can be adjusted to fit each particular case. Hence, there may be connected to an input/output gate a module that reads out data, as well as one that stores data, particularly a peripheral unit, but a control unit associated with the data processing system may likewise be connected therein. Such control units can supply the control data in question for the input/output gates. The component assemblies associated with an input/output gate may be so constructed that they can transfer useful data consisting of data in binary notation to be transmitted in parallel.

BRIEF DESCRIPTION OF THE DRAWINGS

The accompanying figures show a specific illustrative embodiment of the data handling apparatus constructed in accordance with the principles of this invention and a data processing system associated therewith.

FIG. 1 is a schematic diagram providing details of the construction of a data handling apparatus in accordance with the invention.

FIG. 2 is a block schematic diagram showing an example of how two or more data handling apparatus and two or more control units of a data processing system may be interconnected over buses.

DETAILED DESCRIPTION OF THE PREFERRED EMBODIMENT

FIG. 1 shows a data handling apparatus B11 and the component assemblies associated therewith. These component assemblies are partly connected by paths for useful data or data to be processed and partly by paths for control data controlling the component assemblies. The control data paths are shown only where necessary for an understanding of the invention.

The data handling apparatus has as component assemblies, among other things, input/output gates FKV1 . . . FKV5 and buffer storage QS. Peripheral units Y11 . . . Y14 are connected to input/output gates FKV1 . . . FKV4. A line P5 associated with the trunk group P11 leading to the control unit CPU2 is connected to input-/output gate FKV5 (FIG. 2).

Within the data handling apparatus B11 the input-/output gates FKV1 . . . FKV5 are connected to a bus SS, which is connected by a bidirectional amplifier S/E to a line DC associated with trunk group C11. This trunk group leads to the control unit CPU1 (FIG. 2).

The buffer storage QS contains two or more storage locations. It is equipped with the input counter EZ and the output counter AZ, each of which serves as an address generator for addresses of storage locations. The input counter determines the storage location accepting the useful data, and the output counter determines the storage location emitting the useful data. Address decoders DE and DA serve to decode the addresses of the storage locations supplied by the counters.

The counters EZ and AZ can be changed over by application of switching signals to certain of their inputs to alter their counting mode. Thus, during an interconnection of two units of the data processing system, e.g., the control units CPU1 and CPU2, either only units of useful data for a storage location can be accepted or emitted, or they accept or emit a block of useful data requiring two or more storage locations. Therefore, when a block of useful data is accepted, the input counter must be advanced by two or more counter positions consecutively. The address of the storage locations supplied in each case is decoded so as to enable the routing of the useful data waiting for service to the associated storage location. This is repeated until all useful data associated with the block of useful data are accepted one after the other in two or more storage locations during the same interconnection. The output of the useful data associated with this block of useful data is handled in like manner, that is, also during the same interconnection of, for example, two control units. The end of a block of useful data may, for example, be fixed by a prespecified combination of data elements within the block of useful data. This combination of data elements may also be utilized, by means of a special interpreter circuit, for adjusting the counting mode of the counters EZ and AZ.

There is also connected to the counter outputs a comparator VG, which compares the counter adjustments and signals and produces as comparison result the busy/idle condition of the storage locations of the buffer storage QS. The latter indications are sent to the on-line control units CPU1 and CPU2 by means of the signalling bistable elements FC and FP. The line SC outgoing from the signalling bistable element FC is connected to the control unit CPU1, and the line outgoing from the signalling bistable element is connected to the control unit CPU2 (FIG. 2). The signalling bistable elements may be so constructed that they receive two or more units of data in binary notation. The indication of the busy/idle condition of the storage locations of the buffer storage is taken into account as the control units CPU1 and CPU2 fetch and supply items of useful data. Items of useful data may be prevented from being supplied to a buffer storage which is already fully occupied. In the mode described hereinabove, the item of useful data most recently stored is the next item to be retrieved.

As mentioned earlier, the buffer storage QS may be inserted in the data path connecting the control units of the data processing system. For example, in this arrangement the input/output gate FKV5 shall be activated by control data supplied by a control unit. For this purpose, the associated electronic couplers K51 and K52, which may be constructed in a manner known from prior art (cf. West German published application No. 2 409 791) are controlled. In this case, by controlling the electronic couplers K51 and K52, a data path can be established running from the control unit CPU1 to the trunk group C11 of the data handling apparatus B11 and from its line DC over the bus SS connected therein to the buffer storage QS. From this buffer storage the control data can then be transmitted over a line running to the electronic coupler K51 to the line P5 of the trunk group P11. The line P5 runs to the control unit CPU2.

Useful data may also be transmitted in a reverse direction of transmission from the control unit CPU2 to the control unit CPU1 via B11 and to the associated buffer storage QS. In this case, useful data coming in over line P5 are routed via the electronic coupler K51 to the input amplifier V5 and from there transmitted to the buffer storage QS by a direct connection. From there they are transmitted by the bus SS and the bidirectional amplifier S/E to the line DC leading to the control unit CPU1. The output register MU of the buffer storage QS is designed as a multiplexer and, hence, may emit the data items to be retrieved over one or the other of two continuing paths, one of which runs over the bus SS and the other over the electronic coupler K51.

A data path caused to be connected by control data may likewise lead to a peripheral unit. Thus, for example, a useful data path may lead in the manner described above from the control unit CPU1 to the bus SS of the data handling apparatus B11 and, thus, to buffer storage QS. It may then continue through the multiplexer MU to the peripheral unit Y11, for example, using the bus SS, for which the electronic couplers K11 and K12 of the input/output gate FKV1 must properly be controlled through control data. Through appropriate control of these electronic couplers the data path may be established for an input function over the input amplifier V1 or for an output function over an output bistable element F1. Other data paths, as well, may be connected through proper activation of the input/output gates FKV1 . . . FKV5.

The fact that the data handling apparatus B11 has a storage that may be utilized as a buffer storage enables the inclusion of other desirable service features. In one of these features the buffer storage QS, where appropriate, is used as a "push-down" storage for a control unit, particularly for the control unit CPU1 connected to the bus SS by the bidirectional amplifier S/E and, hence, permanently assigned to the data handling apparatus B11. As is generally known, a "push-down" storage comprises a number of identical storage locations, only the first one of which stores a data word. As this data word is transferred into the push-down storage, the content of each storage location enters the next storage location. As the content of the relevant storage location is read, the content of the other storage locations moves back up the column from location to location to fill the space vacated. Hence, the data word most recently stored is the next item to be retrieved. If the buffer storage QS is the push-down storage for the associated control unit CPU1, it can take part in the program operations in this control unit and, for example, during the operation of subroutines store jump addresses momentarily. The operation as a push-down storage is performed by means of the counters EZ and AZ.

Where appropriate, the buffer storage QS may also be used as an intermediate storage for data processing results of a control unit, particularly of the associated control unit CPU1. In order to be able to use its storage locations selectively, the counters EZ and AZ are changed over via their control terminals $c$, using control data, such that they store as address registers addresses of storage locations supplied by the control unit. In this way, any of the storage locations can be called up for accepting or emitting a data word over the multiplexer MU. The utilization of the buffer storage of an ALU by the associated control unit is particularly convenient if no, or very few, peripheral units are connected to this device and if, for example, no other control unit is connected therein.

The buffer storage apparatus B11, which is provided with the buffer storage QS, may be utilized for several operating modes. They are distinguished from each other by the different modes of operation of the buffer storage. In order to be able to switch B11 to one of the different modes through control data it is provided with an operating register MR, which stores control data supplied by the asociated control unit CPU1. This operating register MR is also connected to the bus SS. The data word recorded in each case affects one of the control terminals $a$, $b$, $c$, $d$ and the control terminals of other component assemblies in B11 indicated by like reference symbols. For example, a changeover of the counters EZ and AZ for the operation with blocks of useful data is achieved by applying a control signal to the control terminal $d$. The switching of the counters EZ and AZ to the mode of operation wherein individual data words are accepted and emitted is, for example, achieved by driving the control terminals $c$, and the buffer storage QS is caused to interoperate only with the associated control unit CPU1 using the control terminals $a$. In the latter case, the storing of data from other sources is blocked. Where appropriate, the control data employed therefor are also transferred to other component assemblies of the data handling apparatus B11 taking part in the modes under consideration.

The operating register MR can also store and emit control data supplied from the associated control unit CPU1 which cause component assemblies of B11 to emit test data indicating to the associated control unit CPU1 the operating condition of the component assemblies with a view to checking its function. This mode is initiated by control data coupled to the control terminals $b$. Moreover, the fetching of signalling data from the signalling bistable element FP can also be achieved over the AND element U. Furthermore, the data stored in the output bistable element F1 . . . F5 of the input-/output gates FKV1 . . . FKV5 can be emitted under appropriate control of the electronic couplers K11, K12 . . . K51 and K52 and transferred to the control unit CPU1 over the bus SS. The control unit CPU1 can be used to verify if the data are as expected. For example, data held in the output bistable element F2 are transferred to the control unit CPU1 by means of the electronic coupler K22, the input amplifier V2, the electronic coupler K22, the bidirectional amplifier S/E and the line DC.

Not only control data employed for switching to different modes of operation must be routed to the data handling apparatus B11, but also the data handling apparatus receives the data, by means of which shall be activated component assemblies (e.g., input/output gates) to be used with an already established mode. Two decoders DC and DP are provided in B11 for storing, decoding and transferring such control data. Control data from the associated control unit CPU1 are coupled to the decoder DC by the line AC associated with the trunk group C11. Control data from the control unit CPU2 are routed to the decoder DP by the line AP associated with the trunk group P11. Also, addresses of storage locations are coupled directly to the counters EZ and AZ by these circuits. The decoders DC and DP have control terminals, to which control terminals of other component assemblies indicated by like reference numerals (e.g., of electronic couplers of the input/output gates) are connected. In this way, the electronic couplers K11, K12 . . . K41 and K42 of the input/output gates FKV1 . . . FKV4 can be controlled using the control terminals 1, 2 . . . of the decoder DC. For clarity, not all control features under consideration are shown in detail by such control terminals, but it is indicated that control data for resetting component assemblies such as bistable elements F1 . . . F5 of the input/output gates FKV1 . . . FKV5 and of the counters EZ and AZ may also be transferred over the decoders DC and DP. These are the control terminals $r$ of the decoders connected to the control terminals $r$ of the other devices being considered and indicated by like reference numerals. The other devices may also be reset by the special reset input circuit R. Hence, the resetting of the component assemblies concerned can be achieved by control data from one of the control units CPU1 and CPU2, or also by the special reset input RC.

The data handling apparatus B11 has additional terminals, through which specified control data may be fed. Thus, the utilization thereof may be initiated by means of the control unit CPU1 over the line CE and the mode adapter C. In like fashion, the utilization by the control unit CPU2 may be initiated over the line ZE and the mode adapter Z. Activation of B11 takes place by turning on the supply voltages to the line JL and the mode adapter J connected thereto and which ensures that the supply voltages are properly applied to the various component assemblies (cf. West German patent application No. 24 60 671).

The control unit CPU2 can send control data to the counters EZ and AZ using the line LS of trunk group P11, the utilization of the buffer storage QS for storing and emitting useful data being controlled by the counters. In addition, the direction in which the data can be transferred from location to location by the storage when used as a push-down storage can be set whereby the counting direction of the counters may also be reversed. The appropriate control data may be fed from the associated control unit CPU1 to the line RW of the trunk group C11. In conjunction with the storing and emitting of data, the electronic couplers K51 and K52 are controlled in like manner using the line LS, as shown by the reference symbol Ls, whereby the AND element can also be controlled.

As mentioned earlier, the data handling apparatus B11 is employed as a module within a data processing system having several modules with which, for example, two or more control units are likewise associated. Apart from being associated with the control units CPU1 and CPU2, the data processing system includes the data handling apparatus B11, B12 . . . B21 and B22. Read-only memory Q1 is connected to the control unit CPU1, and the read-only memory Q2 is connected to the control unit CPU2. These read-only memories contain the program instructions to be employed. The data handling apparatus are each connected to the two trunk groups CC1 and CC2 leading to the control units CPU1 and CPU2. Accordingly, the data handling apparatus B11 and B12 are connected therein over their trunk groups C11, P11, C12 and P12. Peripheral units, too, are connected to all data handling apparatus. For example, in the data handling apparatus B11 these are the peripheral units Y21 . . . Y24.

The principles of the invention are described hereinabove by describing a preferred embodiment constructed and operating accordingly. It is contemplated that the described embodiment can be modified or changed in a number of ways known to those skilled in the art without departing from the scope of the invention as defined by the appended claims.

We claim:

1. Data handling apparatus constructed as an integrated circuit on a single substrate for use in a data processing system including at least two control units and said data handling apparatus comprising:
    a plurality of input/output gates for connecting peripheral units in said data processing system to said data handling apparatus for receiving data from said system in said data handling apparatus and for supplying the data to said data processing system,
    storage means having storage locations for, at least temporarily, storing data to be processed, said storage locations forming a part of a data path between portions of said data processing system through said input/output gates,
    input counter means for generating addresses indicating storage locations in said storage means to which data from said input/output gates is to be coupled,
    output counter means for generating addresses indicating storage locations in said storage means from which data is to be coupled to said input/output gates,
    mode switching means in said input and output counter means for selecting, respectively, one of a plurality of modes of operation for said input and output counter means, said modes including one in which data is stored in and emitted from individual storage locations, another in which blocks of data are stored in and emitted from groups of said storage locations, and a third in which said input and output counter means receive and register externally supplied addresses for selecting said storage locations and
    operational register means for receiving and storing control data supplied by a control unit of said data processing system for operating said mode switching means to select and operate according to one of said modes of operation, said input/output gates comprising
    an input amplifier, an output bistable circuit connected in parallel therewith and electronic coupling means for making operative the amplifier or the bistable circuit, responsive to the content of said operational register means,
    said input/output gates each being operable upon receipt of appropriate control data to connect said storage means in the data path between control units of the data processing system.

2. The data handling apparatus defined in claim 1 wherein said storage means is connected to function as a push-down storage with a control unit of said data processing system.

3. The data handling apparatus defined in claim 1 wherein said storage means is connected to function as an intermediate storage for data processing results from a control unit of said data processing system.

4. The data handling apparatus defined in claim 1 further comprising:
    comparator means having inputs connected to outputs of said input and output counter means for producing a comparison signal indicating the state of occupation of said storage locations.

* * * * *